(12) United States Patent
Lin

(10) Patent No.: US 7,242,504 B2
(45) Date of Patent: Jul. 10, 2007

(54) OPTICAL SCANNING APPARATUS

(75) Inventor: Tsung-Te Lin, Taipei (TW)

(73) Assignee: BENQ Corporation, Taoyuan (TW)

( * ) Notice: Subject to any disclaimer, the term of this patent is extended or adjusted under 35 U.S.C. 154(b) by 71 days.

(21) Appl. No.: 10/993,041

(22) Filed: Nov. 19, 2004

(65) Prior Publication Data

US 2005/0111817 A1 May 26, 2005

(30) Foreign Application Priority Data

Nov. 21, 2003 (TW) .............................. 92220584 U

(51) Int. Cl.
*H04N 1/04* (2006.01)
(52) U.S. Cl. ..................... 358/497; 358/474
(58) Field of Classification Search .................. 355/67; 358/474, 497
See application file for complete search history.

(56) References Cited

U.S. PATENT DOCUMENTS

| 4,072,417 | A | * | 2/1978 | Motomura | .................. 355/67 |
| 5,194,898 | A | * | 3/1993 | Costrop et al. | ............. 358/497 |
| 5,218,403 | A | * | 6/1993 | Smith | .......................... 355/39 |
| 5,801,851 | A | * | 9/1998 | Sheng | ........................ 358/497 |
| 6,137,106 | A | * | 10/2000 | Kao | ............................ 250/239 |
| 6,236,470 | B1 | * | 5/2001 | Seachman | .................... 358/471 |
| 6,285,483 | B1 | * | 9/2001 | Shia et al. | .................. 358/497 |
| 6,330,084 | B1 | * | 12/2001 | Chiang | ........................ 358/497 |

\* cited by examiner

*Primary Examiner*—Quyen P Leung
(74) *Attorney, Agent, or Firm*—Quintero Law Office

(57) ABSTRACT

An optical scanning apparatus. The optical scanning apparatus includes a cover module, an optical module and a spacing element. The optical module is connected to the cover module. The spacing element is connected to the cover module and abuts the optical module. The cover module is separated from the optical module at a predetermined distance by the spacing element, and the optical module slides on the spacing element.

20 Claims, 4 Drawing Sheets

OPTICAL SCANNING APPARATUS

BACKGROUND OF THE INVENTION

1. Field of the Invention

The present invention relates to an optical scanning apparatus, and in particular to an optical scanning apparatus with a spacing element.

2. Description of the Related Art

In an optical scanning device (scanner), target media is placed on a transparent glass platen to be scanned by an optical module disposed thereunder. The optical module usually includes a contact image sensor (CIS), moving backward and forward to scan the target media. Specifically, the transparent glass platen is separated from the optical module by a predetermined distance to guarantee a sufficient depth of field (focusing distance) therebetween. Thus, the optical module scans the target media and outputs a clear image corresponding thereto.

Referring to FIG. 1, a conventional optical scanning device 1 includes a transparent glass platen 11, an optical module 12 and a support structure 13. The support structure 13 supports the optical module 12, and the transparent glass platen 11 is disposed on the optical module 12. Additionally, multiple separators (or spacers) 14 are disposed on the optical module 12. The transparent glass platen 11 is supported by the separators 14 and is thereby separated from the optical module 12 by a predetermined distance. Moreover, the depth of field for the optical scanning device 1 is guaranteed by the separators 14. Nevertheless, disposing the separators 14 on the optical module 12 is complicated and inconvenient.

Another optical scanning device uses multiple separators (or spacers) disposed on the support structure thereof to guarantee the depth of field between the transparent glass platen and the optical module thereof. Similarly, disposing the separators (or spacers) on the support structure is complicated and inconvenient.

SUMMARY OF THE INVENTION

Accordingly, an object of the invention is to provide an optical scanning apparatus comprising a cover module, an optical module and a spacing element. The optical module is connected to the cover module. The spacing element is connected to the cover module and abuts the optical module. The cover module is separated from the optical module at a predetermined distance by the spacing element, and the optical module slides on the spacing element.

The spacing element is a strip.

The spacing element comprises a material with low coefficient of friction and high hardness, Polyoxymethylene (POM), or plastic.

The spacing element is attached to the cover module.

The spacing element and cover module are formed integrally.

The cover module is a transparent glass platen.

The cover module is a frame. The spacing element is attached to the frame, or the spacing element and frame are formed integrally.

The cover module further comprises a frame and a transparent glass platen disposed thereunder. The spacing element is attached to the transparent glass platen.

The cover module further comprises a frame and a transparent glass platen surrounded thereby. The spacing element is attached to the frame, or the spacing element and frame are formed integrally.

The optical module further comprises a contact image sensor (CIS) under the cover module.

The optical scanning apparatus further comprises a motor, a bearing, a conveyer and a bar. The motor is connected to the bearing and is disposed on the bar. The bearing is connected to the conveyer. The optical module is disposed on the bar and is connected to the conveyer.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

First Embodiment

Figure 1:
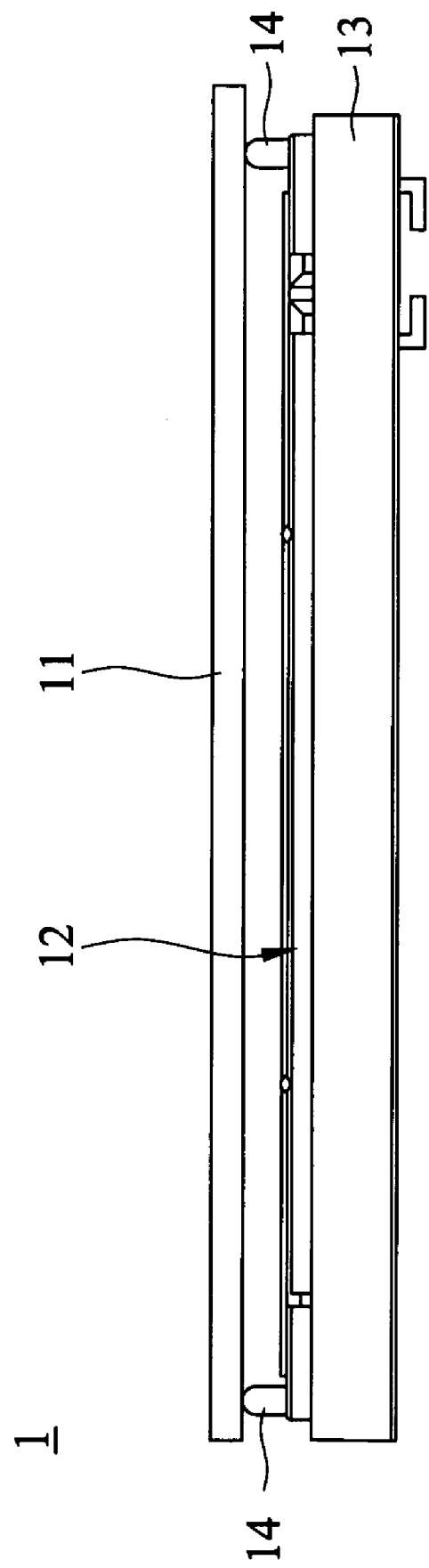
FIG. 1 is a partial side view showing a conventional optical scanning device.
Figure 2:
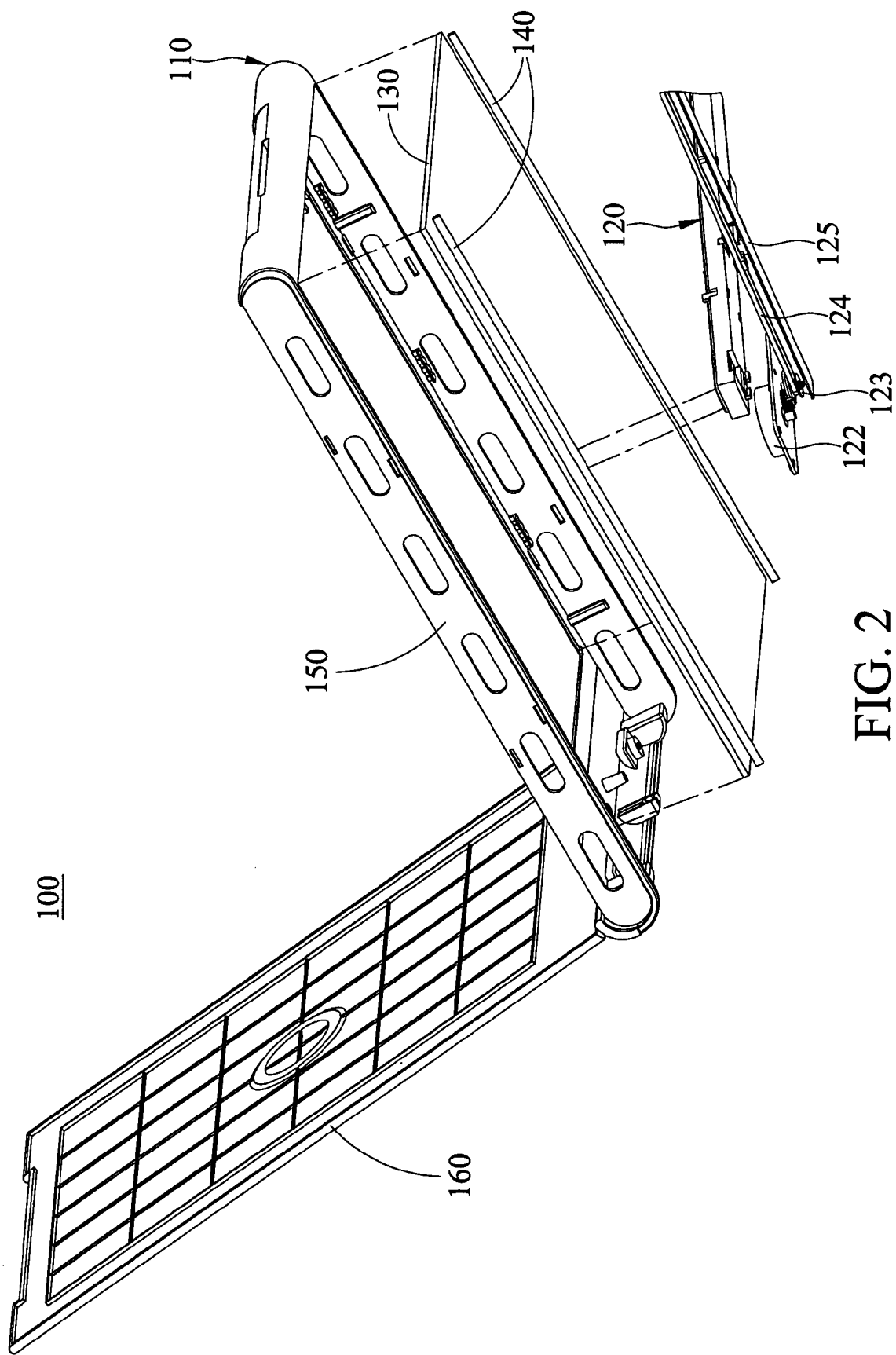
FIG. 2 is a partial exploded perspective view showing the optical scanning apparatus of the first embodiment of the invention.
Figure 3:
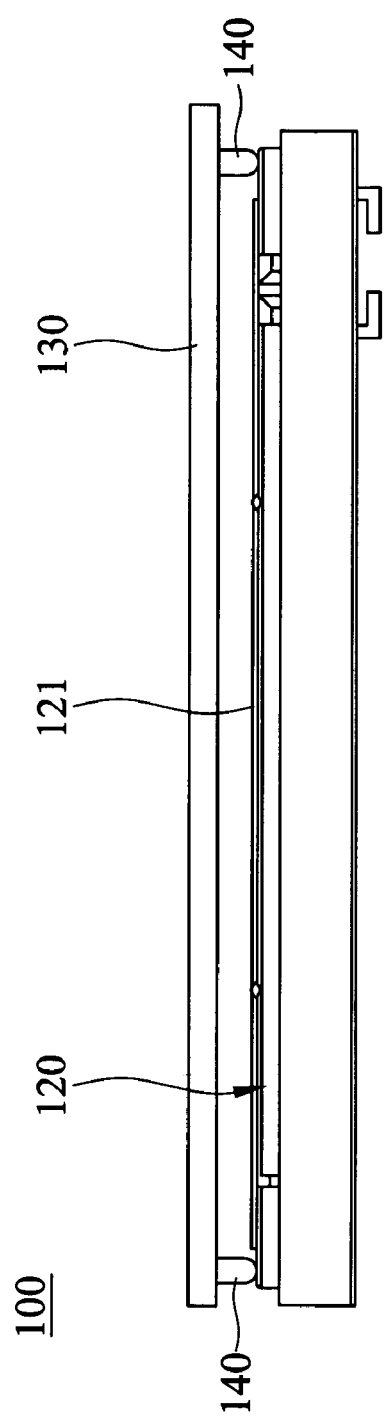
FIG. 3 is a partial side view showing the optical scanning apparatus of the first embodiment of the invention.

Referring to FIG. 2 and FIG. 3, the optical scanning apparatus 100 of this embodiment comprises a cover module 110, an optical module 120 and two spacing elements 140. The spacing elements 140 are strips.

The cover module 110 is disposed on the optical module 120 and has a frame 150 and a transparent glass platen 130. In this embodiment, the transparent glass platen 130 is disposed under the frame 150. A contact image sensor (CIS) 121 is disposed in the optical module 120.

As shown in FIG. 3, the transparent glass platen 130 is disposed on the optical module 120 and contact image sensor (CIS) 121. As shown in FIG. 2, the frame 150 is disposed on the transparent glass platen 130, and a cover 160 is rotatably connected thereto.

The spacing elements 140 are attached to the transparent glass platen 130. As shown in FIG. 3, the spacing elements 140 respectively abut two opposite ends of the optical module 120. The transparent glass platen 130 is separated from the optical module 120 at a predetermined distance (such as 1.3 mm) by the spacing elements 140 to guarantee a sufficient depth of field (focusing distance) therebetween. Additionally, the optical module 120 can move backward and forward under the transparent glass platen 130. Namely, the optical module 120 can slide backward and forward on the spacing elements 140.

Specifically, since the optical module 120 slides on the spacing elements 140, the spacing elements 140 are better composed of a material with low coefficient of friction and high hardness. For example, the spacing elements 140 may be Polyoxymethylene (POM), or plastic.

As shown in FIG. 2, the optical scanning apparatus 100 further includes a motor 122, a bearing 123, a conveyer 124 and a bar 125. The motor 122 is connected to the bearing 123 and is disposed on the bar 125. The bearing 123 is connected to the conveyer 124. The optical module 120 is disposed on the bar 125 and is connected to the conveyer 124. When the motor 122 moves the optical module 120 backward and forward, the optical module 120 slides on the spacing elements 140. At this point, the contact image sensor (CIS) 121 of the optical module 120 scans target media placed on the transparent glass platen 130.

Second Embodiment

Figure 4:
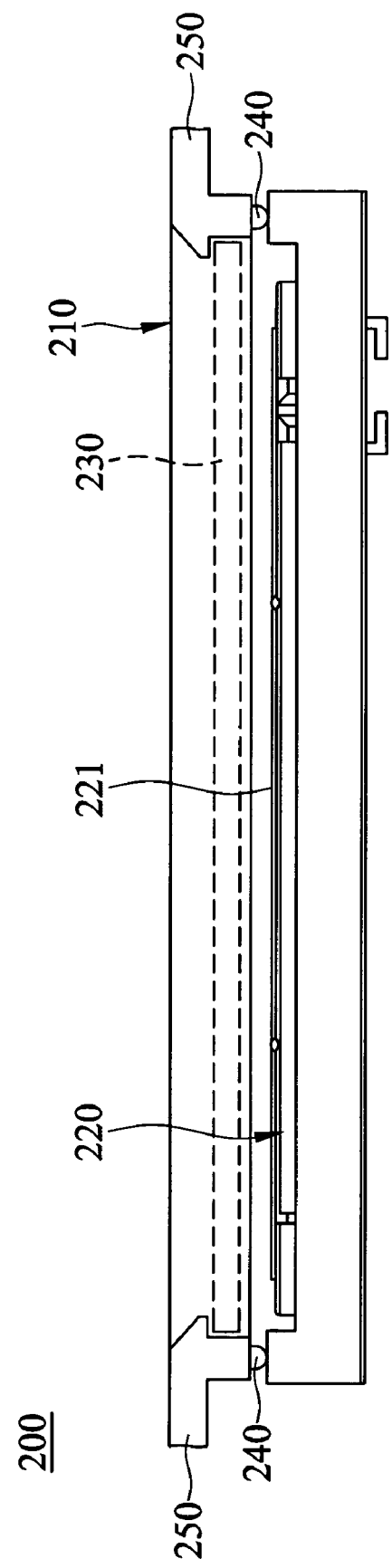
FIG. 4 is a partial side view showing the optical scanning apparatus of the second embodiment of the invention.

Referring to FIG. 4, the optical scanning apparatus 200 of this embodiment comprises a cover module 210, an optical module 220 and two spacing elements 240. The spacing elements 240 are strips.

The cover module 210 is disposed on the optical module 220 and has a frame 250 and a transparent glass platen 230. In this embodiment, the transparent glass platen 230 is surrounded by the frame 250. A contact image sensor (CIS) 221 is disposed in the optical module 220.

As shown in FIG. 4, the frame 250 is disposed on the optical module 220. The transparent glass platen 230 is disposed on the optical module 220 and surrounded by the frame 250. Additionally, the transparent glass platen 230 is above the contact image sensor (CIS) 221.

As shown in FIG. 4, the spacing elements 240 are attached to the frame 250 and respectively abut two opposite ends of the optical module 220. The transparent glass platen 230 is separated from the optical module 220 at a predetermined distance (such as 1.3 mm) by the spacing elements 240 to guarantee a sufficient depth of field (focusing distance) therebetween. Additionally, the optical module 220 can slide backward and forward on the spacing elements 240.

Specifically, since the optical module 220 slides on the spacing elements 240, the spacing elements 240 are better composed of a material with low coefficient of friction and high hardness. For example, the spacing elements 240 may be Polyoxymethylene (POM), or plastic.

Similarly, the optical scanning apparatus 200 further comprises a motor (not shown), a bearing (not shown), a conveyer (not shown) and a bar (not shown) The motor is connected to the bearing and is disposed on the bar. The bearing is connected to the conveyer. The optical module 220 is disposed on the bar and is connected to the conveyer. When the motor moves the optical module 220 backward and forward, the optical module 220 slides on the spacing elements 240. At this point, the contact image sensor (CIS) 221 of the optical module 220 scans target media placed on the transparent glass platen 230.

Third Embodiment

Figure 5:
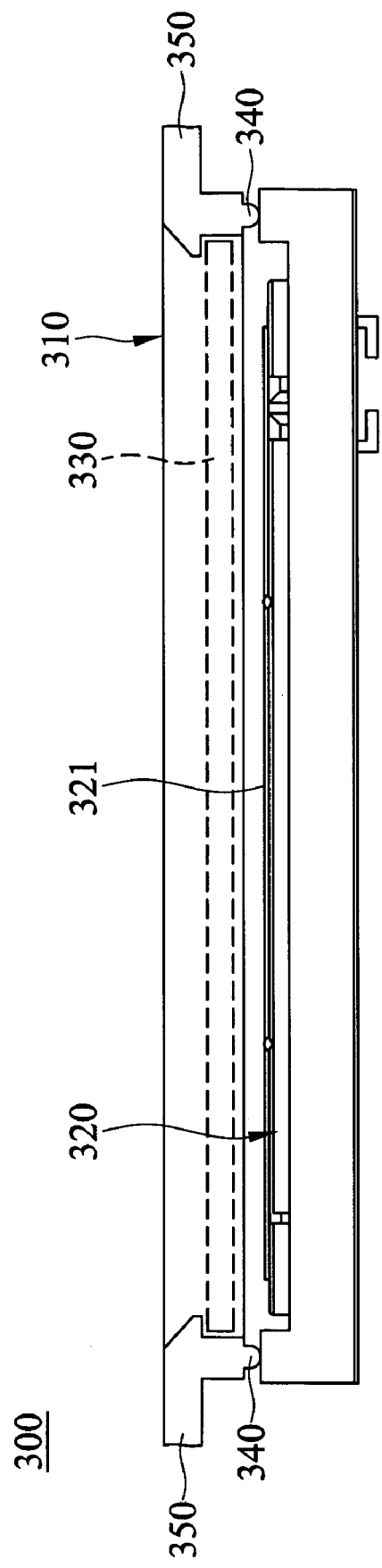
FIG. 5 is a partial side view showing the optical scanning apparatus of the third embodiment of the invention.

Referring to FIG. 5, the optical scanning apparatus 300 of this embodiment comprises a cover module 310, an optical module 320 and two spacing elements 340. The spacing elements 340 are strips.

Similarly, the cover module 310 is disposed on the optical module 320 and has a frame 350 and a transparent glass platen 330. In this embodiment, the transparent glass platen 330 is surrounded by the frame 350. A contact image sensor (CIS) 321 is disposed in the optical module 320.

The difference between this and the second embodiment is that the spacing elements 340 and frame 350 of this embodiment are composed of the same material. Namely, the spacing elements 340 and frame 350 are formed integrally.

Other elements in this embodiment correspond to those in the second embodiment, and explanation thereof is omitted for simplification of the description.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical scanning apparatus, comprising:
   a cover module;
   an optical module connected to the cover module; and
   a spacing element connected to the cover module and abutting the optical module, wherein the cover module is separated from the optical module at a predetermined distance by the spacing element, and the optical module slides on the spacing element;
   wherein the cover module comprises a frame, with the spacing element attached therto.

2. The optical scanning apparatus as claimed in claim 1, wherein the spacing element is a strip.

3. The optical scanning apparatus as claimed in claim 1, wherein the spacing element comprises a material with low coefficient of friction and high hardness.

4. The optical scanning apparatus as claimed in claim 1, wherein the spacing element is Polyoxymethylene (POM).

5. The optical scanning apparatus as claimed in claim 1, wherein the spacing element is plastic.

6. The optical scanning apparatus as claimed in claim 1, wherein the cover module further comprises a transparent glass platen surrounded by the frame.

7. The optical scanning apparatus as claimed in claim 1, wherein the optical module further comprises a contact image sensor (CIS) under the cover module.

8. The optical scanning apparatus as claimed in claim 1, further comprising a motor, a bearing, a conveyer and a bar, the motor connected to the bearing and disposed on the bar, the bearing connected to the conveyer, and the optical module disposed on the bar and connected to the conveyer.

9. An optical scanning apparatus, comprising:
   a cover module;
   an optical module connected to the cover module; and
   a spacing element connected to the cover module and abutting the optical module, wherein the cover module is separated from the optical module at a predetermined distance by the spacing element, and the optical module slides on the spacing element;
   wherein the cover module comprises a frame, with the spacing element and frame formed integrally.

10. The optical scanning apparatus as claimed in claim 9, wherein the cover module further comprises a transparent glass platen surrounded by the frame.

11. The optical scanning apparatus as claimed in claim 9, wherein the spacing element is a strip.

12. The optical scanning apparatus as claimed in claim 9, wherein the spacing element comprises a material with low coefficient of friction and high hardness.

13. The optical scanning apparatus as claimed in claim 9, wherein the spacing element is Polyoxymethylene (POM).

14. The optical scanning apparatus as claimed in claim 9, wherein the spacing element is plastic.

15. The optical scanning apparatus as claimed in claim 9, wherein the optical module further comprises a contact image sensor (CIS) under the cover module.

16. An optical scanning apparatus, comprising:
a cover module;
an optical module connected to the cover module; and
a spacing element connected to the cover module and abutting the optical module, wherein the cover module is separated from the optical module at a predetermined distance by the spacing element, and the optical module slides on the spacing element;
wherein the cover module comprises a frame and a transparent glass platen disposed thereunder, with the spacing element attached to the transparent glass platen.

17. The optical scanning apparatus as claimed in claim 16, wherein the spacing element is a strip.

18. The optical scanning apparatus as claimed in claim 16, wherein the spacing element comprises a material with low coefficient of friction and high hardness.

19. The optical scanning apparatus as claimed in claim 16, wherein the spacing element is Polyoxymethylene (POM).

20. The optical scanning apparatus as claimed in claim 16, wherein the spacing element is plastic.

* * * * *